US006246541B1

United States Patent
Furuichi et al.

(10) Patent No.: US 6,246,541 B1
(45) Date of Patent: Jun. 12, 2001

(54) THIN FILM MAGNETIC HEAD WITH REDUCED MAGNETIC GAP BY INCORPORATING COIL CONDUCTORS WITH CONVEX SURFACES

(75) Inventors: Shinji Furuichi; Kiyoharu Fujita, both of Mohka; Takeo Sasaki, Kumagaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/302,401

(22) Filed: Apr. 30, 1999

(30) Foreign Application Priority Data

May 29, 1998 (JP) .................................................. 10-148910
Jul. 27, 1998 (JP) .................................................. 10-210738

(51) Int. Cl.[7] ...................................................... G11B 5/17
(52) U.S. Cl. ............................................................ 360/123
(58) Field of Search .................................... 360/123, 126, 360/317, 318, 318.1

(56) References Cited

U.S. PATENT DOCUMENTS

| 4,684,438 | 8/1987 | Lazzari ................................. 156/649 |
| 5,059,278 | * 10/1991 | Cohen et al. ........................ 156/643 |
| 5,065,270 | 11/1991 | Koyanagi et al. ................... 360/123 |
| 5,113,300 | * 5/1992 | Ikeda et al. ......................... 360/126 |
| 5,734,534 | * 3/1998 | Yamamoto et al. ................. 360/123 |
| 5,856,898 | * 1/1999 | Ohashi ................................. 360/123 |

FOREIGN PATENT DOCUMENTS

| 2-79207 | 3/1990 | (JP) . |
| 5-325136 | 12/1993 | (JP) . |

* cited by examiner

*Primary Examiner*—Jefferson Evans

(57) ABSTRACT

A thin film magnetic head has insulation between layers that can be maintained even by reducing distances between layers of thin film coils. Accordingly, a magnetic path formed by a lower magnetic core and an upper magnetic core can be reduced. The lowermost-layer thin film conductors have a substantially rectangular cross section and are provided on insulating resin layers formed on a non-magnetic thin film. The thin film conductors of the second lowermost-layer thin film coil have a downward convex bottom surface and are disposed face-to-face in between the adjoining lowermost-layer thin film conductors. The thin film conductors of the second lowermost-layer thin film coil can have a more protruded bottom surface by providing protruded portions on the insulating resin layer and the lowermost-layer thin film conductors on the protruded portions.

21 Claims, 7 Drawing Sheets

THIN FILM MAGNETIC HEAD WITH REDUCED MAGNETIC GAP BY INCORPORATING COIL CONDUCTORS WITH CONVEX SURFACES

BACKGROUND OF THE INVENTION

1. Field of the Invention

This invention relates generally to a thin film magnetic head used for recording and reproducing information in magnetic disk units, and more specifically to a thin film magnetic head comprising a lower magnetic core and an upper magnetic core disposed facing each other via a non-magnetic thin film serving as a magnetic gap, and a thin film coil wound on the magnetic core between the upper and lower magnetic cores, in which the length of a magnetic path formed through these magnetic cores can be reduced.

2. Description o the Related Art

A separate recording/reproduction type magnetic head comprises a magneto-resistive head and an inductive head laminated on a non-magnetic substrate 10 made of a material, such as alumina/titanium carbide, as shown in the perspective view of FIG. 10. The separate recording/reproduction magnetic head which is manufactured with thin film technology is often called a "thin film magnetic head" as a generic term. The inductive head has also heretofore been called the "thin film magnetic head". In this Specification, therefore, the term "thin film magnetic head" is used referring to the "separate recording/reproduction type magnetic head" and/or the "inductive head."

In FIG. 10, a thin film magnetic head has on a non-magnetic substrate 10 an alumina layer 12, a lower shield 13, a magneto-resistive element 14, a magnetic film 15 serving as an upper shield and a lower magnetic core (hereinafter referred to as "lower magnetic core"), and an upper magnetic core 16. In the figure, an insulating film for insulating between the layer shield, the magneto-resistive element and the upper shield is omitted. As shown in FIG. 11 illustrating the longitudinal section of the head shown in FIG. 10 in the gap depth direction, the head has a non-magnetic thin film 17 comprising alumina, etc. between the lower magnetic core 15 and the upper magnetic core 16. The non-magnetic thin film 17 serves as a magnetic gap, through which opposing ends of both magnetic films form magnetic poles 151 and 161 of the thin film magnetic head.

An exciting coil is wound between the lower magnetic core 15 and the upper magnetic core 16. A thin film coil is used as the exciting coil, with the number of turns of this coil being normally 10 to 15 turns to maintain the magnetic and electric conversion characteristics between the upper and lower magnetic cores and the coil. In order to reduce the inductance of the head by reducing the space occupied by the coil between the upper and lower magnetic cores, it has been commonly practiced to dispose the thin film coil in multiple, normally two, layers. A non-magnetic insulating resin layer is packed between the thin film conductors to insulate between the thin film conductors of the coil, and between the thin film conductors of the coil and the magnetic cores. FIG. 11 is a cross-sectional view of one head having a thin film coil arranged in two layers. As shown in the figure, an insulating resin layer 43 is formed on a non-magnetic thin film 17 deposited on a lower magnetic core 15. Since the non-magnetic thin film 17, made of alumina, etc., serves as a magnetic gap for the thin film magnetic head between both magnetic cores, the thickness thereof is as thin as 0.3 to 0.4 $\mu$m, about the length of the magnetic gap. The insulating resin layer 43, however, is required to have a certain thickness, about 1.5 to 2.5 $\mu$m, for example, because the shoulder of the magnetic pole 161 at the end of the upper magnetic core 16 rests on part of the insulating resin layer 43, defining the apex of the magnetic head.

Thin film conductors of the bottom-layer thin film coil 41 are arranged in parallel to each other on the insulating resin layer 43. Another insulating resin layer 44 is packed in such a manner as to embed the bottom-layer thin film coil 41. Thin film conductors of the upper-layer thin film coil 42 are formed in parallel to each other on the insulating resin layer 44, and still another insulating resin layer 45 is packed in such a manner as to embed the upper-layer thin film coil 42. An upper magnetic core 16 is formed on top of the insulating resin layer 45. A magnetic path for the thin film magnetic head is formed through the upper and lower magnetic cores 16 and 15.

The width of the thin film conductors of the thin film coils 41 and 42 is normally 2 to 4 $\mu$m, and the intervals of the thin film conductors are of almost the same size. With the growing trend toward miniaturization of thin film magnetic heads, however, their sizes are expected to be gradually reduced; the width of the thin film conductors is expected to be reduced to 1.2 $\mu$m, or even to 1 $\mu$m in the future, and the intervals of the thin film conductors also are expected to be reduced to 1.2 $\mu$m, or to 0.8 to 1 $\mu$m in the future. The thickness of the thin film conductors, which is normally 2.5 to 4 $\mu$m, is required to be at least about 2 $\mu$m because too thin a thickness of the thin film conductors could increase the electrical resistance of the coil. Insulating layers of about the same thickness as the thin film conductors must be provided above and below the thin film conductors. Since the two or three-layer coil is provided between the lower and upper magnetic cores 15 and 16, the magnetic path formed is normally 20 $\mu$m in height and 50 $\mu$m in length, with the total magnetic path length being approximately 140 $\mu$m. The inductance of the thin film magnetic head having such a magnetic path is about 0.1 to 0.12 $\mu$H (frequency: 1 MHz) with a 11-turn coil.

SUMMARY OF THE INVENTION

Means for improving the writing characteristics of thin film magnetic heads at high frequencies have been studied to increase recording density. To this end, their inductance must be reduced.

It is therefore an object of this invention to provide a thin film magnetic head that can reduce a magnetic path formed through lower and upper magnetic cores while maintaining layer insulation even with reduced intervals between the layers of the thin film coil, and a manufacturing method of the same.

The thin film magnetic head according to an embodiment of this invention comprises lower and upper magnetic cores provided facing each other via a non-magnetic thin film serving as a magnetic gap, and at least two layers of a multi-layer thin film coil insulated by insulating resin layers between these magnetic cores and comprising thin film conductors which are substantially rectangular in cross section and wound on the magnetic cores, in which thin film conductors of at least one layer, other than the lowermost layer, of the thin film coil have a downward convex bottom surface, and thin film conductors of the thin film coil of the layer immediately below the thin film conductors having a downward convex bottom surface have an upward convex top surface, and the thin film conductors having a downward convex bottom surface are provided face-to-face in between the adjoining thin film conductors of the lower layer of the thin film coil in the longitudinal section in the gap depth direction of the head.

The thin film magnetic head according to another embodiment of this invention comprises lower and upper magnetic cores provided facing each other via a non-magnetic thin film serving as a magnetic gap, and at least two layers of a multi-layer thin film coil insulated by insulating resin layers between these magnetic cores and comprising thin film conductors which are substantially rectangular in cross section and wound on the magnetic cores, in which the insulting resin layer formed on the non-magnetic thin film has projected parts thereon, with the thin film conductors of the lowermost layer of the thin film coil provided on the projected parts, and the thin film conductors of the second lowermost layer of the thin film coil have a downward convex bottom surface and provided face-to-face in between the adjoining thin film conductors of the lowermost thin film coil.

The thin film magnetic head according to a preferred embodiment of this invention should have such a construction that part of the thin film conductors of layers, other than the uppermost layer, of the thin film coil have an upward convex top surface.

The thin film magnetic head according to yet another embodiment of this invention comprises lower and upper magnetic cores provided facing each other via a non-magnetic thin film serving as a magnetic gap, and at least two layers of a multi-layer thin film coil insulated by insulating resin layers between these magnetic cores and comprising thin film conductors which are substantially rectangular in cross section and wound on the magnetic cores, in which the thin film conductors of at least one layer, other than the lowermost layer, of the thin film coil have rounded corners on the side and bottom surfaces of the thin film conductors, the thin film conductors of the thin film coil of a layer immediately below the thin film coil layer whose thin film conductors have rounded bottom-surface corners have rounded corners on the side and top surfaces of the thin film conductors, and the thin film conductors having rounded bottom-surface corners are provided face-to-face in between the adjoining thin film conductors of the thin film coil of the lower layer in the longitudinal section in the gap depth direction of the head.

The thin film magnetic head according to a further embodiment of this invention comprises lower and upper magnetic cores provided facing each other via a non-magnetic thin film serving as a magnetic gap, and at least two layers of a multi-layer thin film coil insulated by insulating resin layers between these magnetic cores and comprising thin film conductors which are substantially rectangular in cross section and wound on the magnetic cores, in which an insulating resin layer formed on the non-magnetic thin film has projected parts thereon, with the thin film conductors on the lowermost layer of the thin film coil provided on the projected parts, the thin film conductors of at least one layer, other than the lowermost layer, of the thin film coil have rounded corners on the side and bottom surfaces of the thin film conductors, the thin film conductors of the thin film coil of a layer immediately below the thin film coil layer whose thin film conductors have rounded bottom-surface corners have rounded corners on the side and top surfaces of the thin film conductors, and the thin film conductors having rounded bottom-surface corners are provided face-to-face in between the adjoining thin film conductors of the thin film coil of the lower layer.

The thin film magnetic head according to a preferred embodiment of this invention should have such a construction that the height h of the projected parts of the insulating resin layer formed on the non-magnetic thin film is 0.04 to 2 $\mu$m, or more preferably 0.2 to 0.5 $\mu$m.

In the thin film magnetic head according to another preferred embodiment of this invention, the non-magnetic thin film should be such that the part thereof serving as a magnetic gap be thinner than the part extended from the magnetic gap part, and that the ratio of the thickness difference h' to the projected height h of the projected part (h'/h) be 0.1 to 0.5. Furthermore, the non-magnetic thin film should preferably be such that the magnetic gap part thereof is thinner than the part extended from the magnetic gap part, and that the thickness difference h' be $\frac{1}{5}$ to $\frac{1}{15}$ of the magnetic gap length.

The thin film magnetic head according to another embodiment of this invention comprises a plurality of layers of the thin film coil comprising thin film conductors which are substantially rectangular in cross section, insulating resin layers below the thin film coil of each layer; a first insulating resin layer having undulations on the surface thereof, with the thin film conductors of the thin film coil of the lowermost layer provided on the projected parts thereof, a second insulating resin layer having undulations on the surface thereof, with the thin film conductors of the thin film coil of the second layer provided on the recess part thereof, and an n-th insulating resin layer having irregularities on the surface thereof, with the thin film conductors of the thin film coil of an n-th layer provided on the recess part thereof.

In the thin film magnetic head according to a preferred embodiment of this invention, the corners of the thin film conductors should preferably have a roundness of not less than 0.2 $\mu$m.

In the thin film magnetic head according to further embodiments of this invention, the overlap of the adjoining thin film conductors of the thin film coil of the lower layer and the thin film conductors of the thin film coil of the upper layer in the longitudinal section in the gap depth direction of the head should preferably be not more than $\frac{1}{4}$ of the width of the thin film conductors, and more preferably not more than the rounded part of the corners of the thin film conductors.

The manufacturing method of the thin film magnetic head according to an embodiment of this invention comprises forming on a lower magnetic core a non-magnetic thin film that serves as a magnetic gap, forming an insulating resin layer on the non-magnetic thin film, but not on the area thereof serving as a magnetic gap, repeating by the necessary number of times the formation on the insulating resin layer of a thin film coil comprising thin film conductors with substantially rectangular cross-section and an insulating resin layer covering the thin film coil, and forming thereon an upper magnetic core, in which the thin film coil of the lowermost layer is formed by depositing an electrically conductive film by sputtering on the insulting resin layer, electroplating thin film conductors on the electrically conductive film to form thin film coil layer thereon, removing by ion milling the electrically conductive film between the thin film conductors, and removing by ion milling the upper parts of the underlying insulting resin layer in between the thin film conductors in such a manner that the insulating resin layer has projected parts under the thin film conductors.

In the manufacturing method of a thin film magnetic head according to a preferred embodiment of this invention, it is desirable to determine the length of a magnetic gap by ion milling the magnetic gap part of the non-magnetic thin film simultaneously with removing by ion milling the electrically conductive film in between the thin film conductors of the thin film coil and the upper parts of the insulating resin layer in between the thin film conductors.

In the manufacturing method of a thin film magnetic head according to another preferred embodiment of this invention, it is desirable to cover with another insulating resin layer the thin film coil of the lowermost layer and the insulating resin layer the upper parts of which in between the thin film conductors been removed by ion milling, to form this other insulating resin layer having undulations on the surface thereof, and then form thin film conductors of the thin film coil of the second layer in the troughs.

BRIEF DESCRIPTION OF THE DRAWINGS

In the following, embodiments of this invention will be described in more detail, referring to the accompanying drawings throughout which like parts are indicated by like numerals.

DESCRIPTION OF THE PREFERRED EMBODIMENTS

Figure 1:
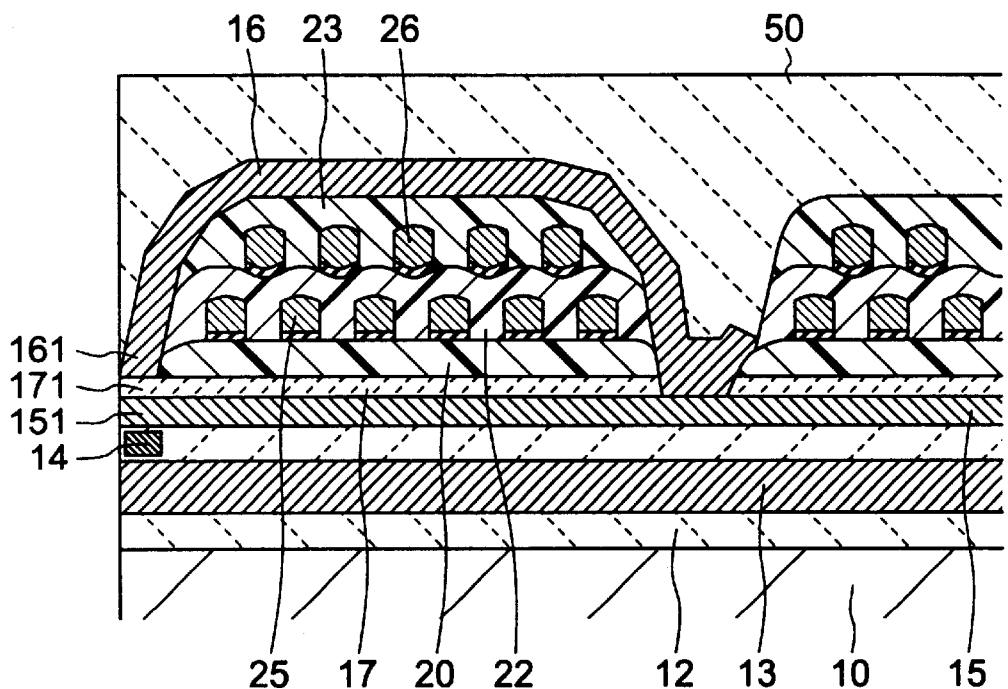
FIG. 1 is a longitudinal sectional view of major parts of a thin film magnetic head embodying this invention.
Figure 2:
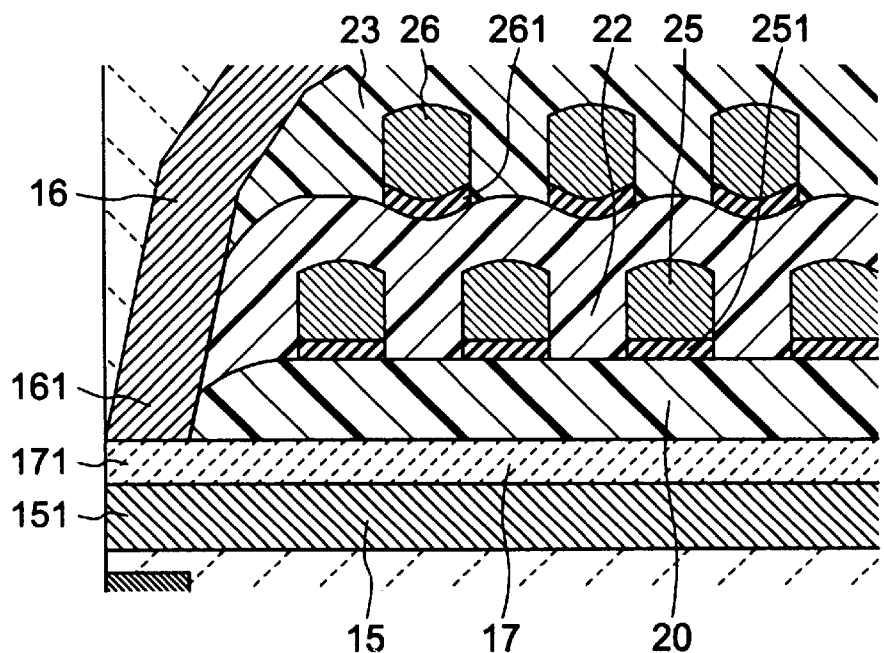
FIG. 2 is a partially enlarged view of FIG. 1.
Figure 3:
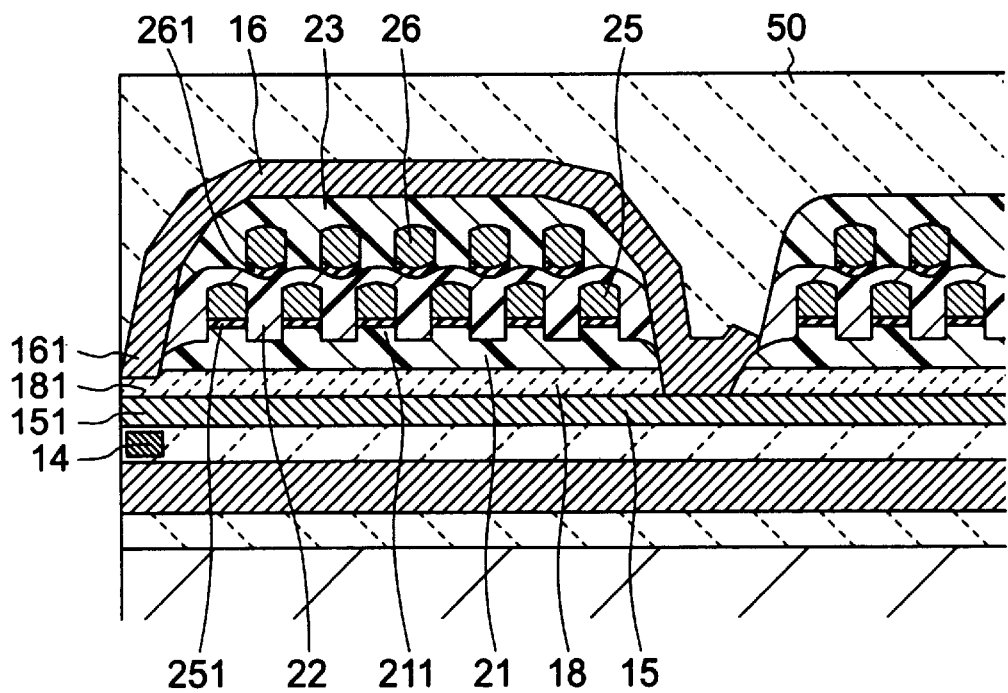
FIG. 3 is a longitudinal sectional view of major parts of another embodiment of the thin film magnetic head according to this invention.
Figure 4:
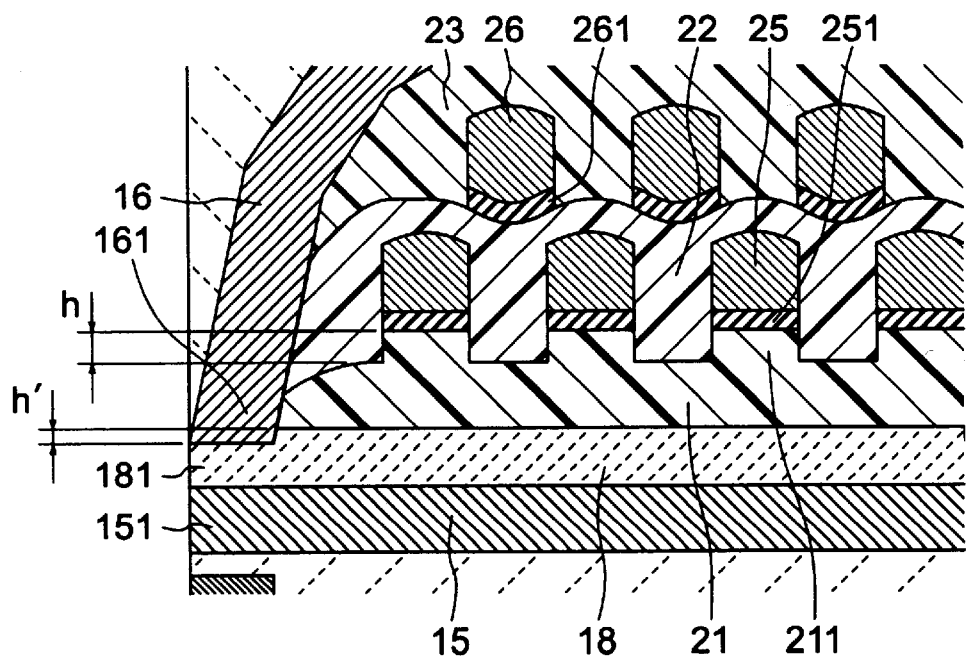
FIG. 4 is a partially enlarged view of FIG. 3.
Figure 5:
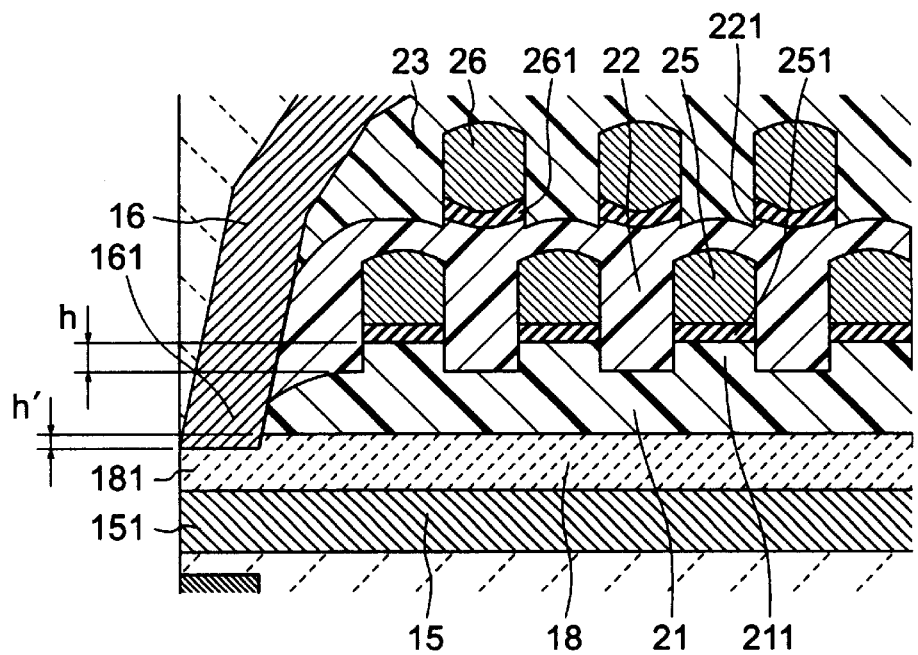
FIG. 5 is a partially enlarged view of FIG. 3 where the underlying conductive film of the thin film coil of the second layer was removed by ion milling.

In FIGS. 1 to 5, numerals 15 and 16 denote lower and upper magnetic cores, respectively; the lower magnetic core 15 is laminated with a magneto-resistive element 14 via an insulating layer. On the top surface of the lower magnetic core 15 there is provided a non-magnetic thin film 17 or 18 made of alumina, etc. Edge parts of the lower and upper magnetic cores 15 and 16 face each other via the non-magnetic thin film 17 or 18, constituting magnetic poles 151 and 161 of the thin film magnetic head. Since the non-magnetic thin film 17 or 18 lying between the magnetic poles 151 and 161 of the lower and upper magnetic cores 15 and 16 works as a magnetic gap 171 or 181 of the magnetic head, affecting the bit length of signals being recorded, the thickness of the non-magnetic thin films 17 and 18, that is the length of the magnetic gaps, is strictly controlled. To this end, a method of obtaining a desired magnetic gap length by processing by ion milling and the like only the magnetic gap portion of the sputtered non-magnetic thin film 18 is being employed. In FIGS. 3 to 5, the magnetic gap length 181 is made thinner or shorter than the thickness of the non-magnetic thin film 18. In the thin film magnetic head, a magnetic path is formed through the lower and upper magnetic cores 15 and 16. An exciting coil usually comprises thin film conductors with substantially rectangular cross section, lying in parallel each other. In this embodiment, the exciting coil comprises a thin film coil 25 of the lowermost layer provided closer to the lower magnetic core 15, and a thin film coil 26 of the second layer provided above them. Both coils are wound in such a manner to enclose the magnetic path.

Thin film conductors comprising the thin film coils 25 and 26 of the upper and lower layers have a substantially rectangular cross section. Although the thin film conductors may be formed by electroplating into a square, trapezoidal or inverted trapezoidal cross section, depending on the shape of the photoresist film used, or the upper part of the cross section thereof may be rounded, depending on the additive added to the electroplating solution, or the lower part of the cross section thereof may be rounded in accordance with undulations on the underlying insulating resin layer, the cross-sectional shape of the thin film conductors is generally defined here as substantially rectangular, including the above-mentioned variations.

In the example shown in FIGS. 1 and 2, an insulating resin layer 20 is provided on an extended portion of the non-magnetic thin film 17 provided between the magnetic poles, and the thin film coil 25 of the lowermost layer is arranged, lying in parallel to each other, thereon. The top surface of the thin film conductors of the thin film coil 25 of the lowermost layer are convex upward, that is, corners on the side and top surfaces of the thin film conductors are rounded. The thin film coil 25 of the lower layer is enveloped by a second insulating resin layer 22. The top surface of the second insulating resin layer 22 has undulations in such a manner as to protrude on the thin film conductors of the lower-layer thin film coil 25 and sink in between the thin film conductors, and the thin film conductors of the upper-layer thin film coil 26 are provided at the recessed parts of the second insulating resin layer 22 corresponding to the parts in between the thin film conductors of the lower-layer thin film coil 25. This means that the thin film conductors of the upper-layer thin film coil 26 are located in between the thin film conductors of the lower-layer thin film coil 25 in the longitudinal section in the gap depth direction of the head. The thin film conductors of the upper-layer thin film coil 26 are provided in the recessed parts of the second insulating resin layer 22, with the bottom surface thereof being convex downward. The upper-layer thin film coil 26 has a rectangular cross section, and each corner on the side and bottom surfaces of the thin film conductors thereof faces the rounded corners of the thin film conductors of the lower-layer thin film coil 25 and is rounded.

On the other hand, in the example shown in FIGS. 3 to 5, an insulating resin layer 21 is provided on an extended part of the non-magnetic thin film 18 and has protruded parts 211, on which the thin film conductors of the lowermost-layer thin film coil 25 are provided. The protruded height of the protruded parts 211 is 0.04 to 2 $\mu$m, or more preferably 0.2 to 0.5 $\mu$m. The thin film conductors of the lower-layer thin film coil 25 and the protruded parts 211 are enveloped by another insulating resin layer 22, the top surface of which has undulations in such a manner as to protrude on the thin film conductors of the lowermost-layer thin film coil 25 and sink in between the thin film conductors; and the thin film conductors of the second-layer thin film coil 26 are provided at the recessed parts of the insulating resin layer 22 corresponding to the portion in between the thin film conductors of the lowermost-layer thin film coil 25. The bottom surface of the second-layer thin film coil 26 provided at the recessed parts of the insulating resin layer 22 is convex downward. The upper-layer thin film coil 26 also has a rectangular cross section and each corner on the side and bottom surfaces of the conductors thereof faces the rounded corners of the thin film conductors of the lower-layer thin film coil 25 and rounded.

The roundness of these conductor corners should preferably be 0.2 $\mu$mR (in radius) or more, preferably be 0.3 to 0.5 $\mu$mR. The distance in the height direction between the top surface of the thin film conductors of the lower-layer thin film coil 25 and the bottom surface of the thin film conductors of the upper-layer thin film coil 26 should preferably be not less than 1.0 $\mu$m. The second-layer thin film coil 26 is enveloped by still another insulating resin layer 23. Although the top surface of the thin film conductors of the second-layer thin film coil 26 is shown as convex upward in FIGS. 1 to 5, it may be flat.

In between the adjoining thin film conductors of the lowermost-layer thin film coil 25, there is provided face-to-face the downward convex thin film conductors of the second-layer thin film coil 26. In particular, when the top surface of the thin film conductors of the lower-layer thin film coil is convex upward, the downward convex thin film conductors of the upper-layer thin film coil are provided face-to-face in between the upward convex thin film conductors of the lower-layer thin film coil, so that both the upper- and lower-layer thin film conductors can be disposed near to each other to such an extent that the opposing ends thereof are made almost on a level with each other, depending on the degree of roundness on the facing corners of the upper and lower-layer thin film conductors.

By providing face-to-face the thin film conductors of the upper layer almost in between the thin film conductors of the lower layer, the thin film conductors of the upper layer are disposed substantially in between the lower-layer thin film conductors when the longitudinal section in the gap depth direction of the head is viewed from the side, as will be described later, and the thin film conductors of the upper and lower layers may be partially overlapped, so long as the distance between the facing corners of the thin film conductors of the upper and lower layers is not reduced.

Figure 7:
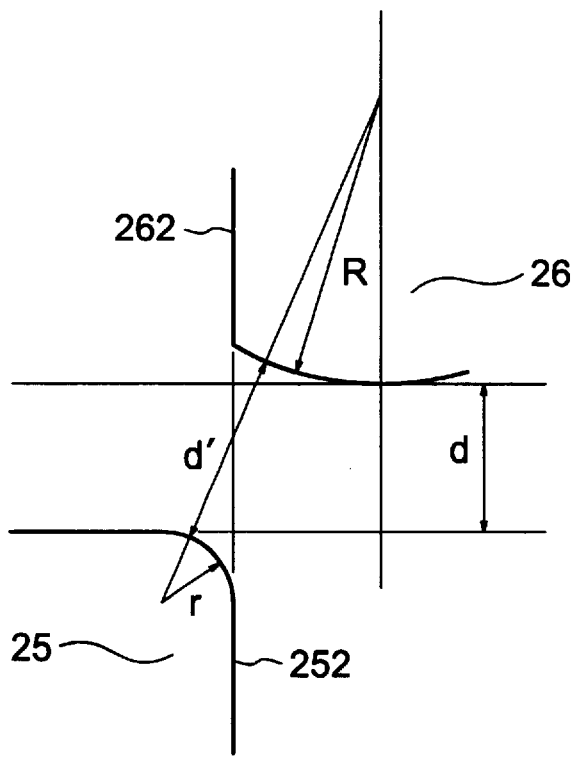
FIG. 7 is a longitudinal sectional view explaining a model where facing corners of the thin film conductors of the upper and lower layers are rounded.

When the insulating resin layer 21 of the lowermost layer has protruded portions 211 on the upper surface, on which the thin film conductors of the lowermost-layer thin film coil 25 are formed as shown by the thin film magnetic head in FIGS. 3 to 5, there is made a greater difference in height between the top surface of the thin film conductors of the lowermost-layer thin film coil 25 and the top surface of the insulating resin layer in between them. Since the thin film conductors of the thin film coil are formed in 2 to 4 $\mu$m in thickness, there is a height difference of this thickness plus the height of the protruded portion 211 of 0.4 to 2 $\mu$m between the top surface of the lowermost insulating resin layer 21 and the top surface of the thin film conductors of the lowermost thin film coil 25. By applying another insulating resin layer 22 to them, the top surface of the insulating resin layer 22 has such undulations that protrude on the thin film conductors of the lowermost-layer thin film coil 25 and dent in between the thin film conductors, and the difference between the peaks and troughs of the undulations increases. As the difference between the peaks and troughs of the undulations increases, the curvature of the roundness on the bottom corners of the thin film conductors of the upper-layer thin film coil 26 is increased. That is, the radius R of the roundness of the bottom surface in the example shown in FIG. 7 is reduced, and as a result, the distance between the bottom surface of the upper layer thin film coil 26 and the facing corners of the lowermost-layer thin film conductors is increased. Even when the insulating resin layer 22 on the thin film conductors of the lowermost-layer thin film 25 is made to a thickness sufficient to obtain an adequate insulation breakdown voltage between the layers of the thin film coil, the thin film conductors of the upper-layer thin film coil 26 at the trough portions of the undulations can be closer to the level at the tops of the thin film conductors of the lowermost-layer thin film coil 25.

The thin film magnetic head according to the preferred embodiments of this invention can be manufactured with a conventional lithography technology. Insulating resin layers 20 and 21 are formed by applying a photoresist film to non-magnetic thin films 17 and 18 made of alumina, etc., except the portion where an upper magnetic core 16 is to be formed. The insulating resin layer 21 is made to a thickness that can accommodate the height of a protruded portion 211 that will be formed later. On top of the insulating resin layer 21, an electrically conductive material, such as copper, is deposited by sputtering to form an electrically conductive film 251, on which a lowermost-layer thin film coil 25 is formed. Next, a photoresist film is applied to the surface of the electrically conductive film 251 and baked at a predetermined temperature. A photomask is brought into precise alignment on the photoresist film. Then, the photoresist film, together with the photomask, is exposed, developed and rinsed with water. Thus, a photoresist pattern corresponding to the shape of the lowermost-layer of thin film coil 25 is formed. Next, the lowermost-layer thin film coil 25 is formed by electroplating using a electroplating solution, such as copper sulfate. When a smoothing agent and a brightener are added to the electroplating solution to refine the crystal grain size, the current density at the ends of the copper strip used during electroplating is reduced. As a result, the top surface of the thin film conductors of the thin film coil 25 becomes convex upward, and the upper corners are rounded, as is well known. After the photoresist film has been removed, the electrically conductive film in between the thin film conductors of the thin film coil 25 is removed. In this way, the lowermost-layer thin film coil 25 is completed. The areas of the electrically conductive film in between the thin film conductors can be removed by chemical etching or ion milling. With chemical etching, the thin film coil 25 as shown in FIGS. 1 and 2 can be successfully manufactured without removing the surface of the insulating resin layer 20 below it. In this case, the thickness of the non-magnetic thin film 17 must be set in advance so that a predetermined magnetic-gap length can be obtained since the magnetic gap portion 171 of the non-magnetic thin film 17 is hardly removed with chemical etching.

As the distance between the thin film conductors of the coil is reduced, on the other hand, ion milling has been increasingly used to remove the underlying conductive film. With ion milling, the upper part of the insulating resin layer 21 between the conductors is slightly removed, as shown in FIGS. 3 to 5.

When the electrically conductive film 251 is removed with ion milling, the upper part of the insulating resin layer 21 below the electrically conductive film 251 in between the thin film conductors of the lowermost-layer thin film coil 25 is removed to form protruded portions below the thin film conductors of the thin film coil 25. The milling operation is further continued to partially remove the portion of the non-magnetic thin film 18 where the magnetic gap 181 is to be formed to a thickness sufficient to form a magnetic gap length. It is most desirable to ion-mill the non-magnetic thin film so that the milled thickness h' becomes ⅕ to ¹⁄₁₅ the magnetic gap length. The photoresist film constituting the insulating resin layer 21 has a higher milling rate and is easier to ion mill, compared with an alumina material constituting the non-magnetic thin film 18. A desired magnetic gap length can be obtained by milling a non-magnetic thin film having a low milling rate to a thickness equal to ⅕ to ¹⁄₁₅ the magnetic gap length. During this milling operation, the surface layers of the electrically conductive film 251 and the insulating resin layer 21 in between the thin film conductors of the lowermost-layer thin film coil 25 are removed. Setting the ratio (h'/h) of the ion-milled thickness of the non-magnetic thin film 18 to the protruded height h (corresponding to the thickness of the portion of the insulating resin layer 21 that is removed by ion milling) of the protruded portion 211 to 0.1 to 0.5, large undulations can be obtained on the surface of the insulating resin layer 22 formed thereon.

Next, a photoresist is filled on the lowermost-layer thin film coil 25 in such a manner as to wrap up the coil 25, and heated and cured at a temperature of about 270° C., whereby an insulating resin layer 22 having on the top surface thereof the aforementioned undulations is formed. Undulations can be obtained by applying a photoresist film to an extremely small thickness while increasing the revolution of the substrate, or by using a photoresist of a low viscosity, or by exposing and developing the second resin layer, then exposing the entire photoresist surface again to cause the non-photosensitive radicals and heating the photoresist to improve its fluidity, thereby causing it to cure into an undulated shape. Next, an electrically conductive material, such as copper, is deposited by sputtering on the entire top surface of the insulating resin layer 22 to form an underlying electrically conductive layer 261, which essentially replicates the undulations on the top surface of the insulating resin layer 22 below it. A photoresist film is then applied to the surface of the electrically conductive film 261 and baked at a predetermined temperature. A photomask is placed on the photoresist film in such a manner that the window of the photomask agrees with the recessed part of the insulating resin layer 22 in between the thin film conductors of the lowermost-layer thin film coil 25. The photoresist film, together with the photomask, is exposed, developed and rinsed with water. Next, a second-layer thin film coil 26 is formed by electroplating using a electroplating solution, such as copper sulfate. Since the thin film conductors of the upper-layer thin film coil 26 are formed on the downward convex portion of the electrically conductive film 261, the bottom surface of the thin film conductors of the upper-layer thin film coil 26 is also convex downward. After the photoresist film has been removed, the electrically conductive film 261 in between the thin film conductors is removed by ion milling to complete the second-layer thin film coil 26.

As the electrically conductive film 261 is removed by ion milling, the surface of the insulating resin layer 22 below it is also slightly removed, producing a shoulder 221, as shown in FIG. 5. If the electrically conductive film 261 is removed by chemical etching, instead of ion milling, only the electrically conductive film 261 can be removed without removing the insulating resin layer 22, as shown in FIG. 4.

Next, a photoresist is filled on the second-layer thin film coil 26 to wrap the thin film conductors of the coil 26 and heated to form another insulating resin layer 23. Since an upper magnetic core 16 is formed on this insulating resin layer 23, undulations having protrusions on the thin film conductors and recesses in between the thin film conductors are not desirable. To cope with this, as thick a photoresist as possible should be applied, or a photoresist of a high viscosity should be applied. It is desirable to avoid a process where the entire surface of the photoresist is exposed again to react the non-photosensitive radicals and to increase the fluidity of the photoresist film by heating, unlike the above-mentioned process. The magnetic head is completed by forming an upper magnetic core 16 and providing a protective film 50.

When the bottom surface of the upper thin film conductors of the coil and the top surface of the lower thin film conductors of the coil are flat, a necessary layer distance for maintaining insulation between the lower-layer and upper-layer thin film conductors is assumed to be "d". Since the bottom surface of the thin film conductors of the upper-layer thin film coil 26 is convex downward according to this embodiment of the invention, the height of the protruded portions is set to $\delta_2$. Then, the layer distance can be reduced down to d−$\delta_2$ by disposing the thin film conductors of the upper-layer thin film coil 26 in between the thin film conductors of the lower-layer thin film coil 25. When the top surface of the thin film conductors of the lower-layer thin film coil 25 is convex upward, the height of the protruded portions is set to $\delta_1$. Then, the layer distance can be reduced down to d−$\delta_1$. Thus, the overall layer distance can be reduced down to d—$\delta_1$−$\delta_2$ result of both effects.

In the thin film magnetic head according to embodiments of this invention, the thin film conductors of the lower-layer and upper-layer thin film coils are substantially rectangular in cross section; the thin film conductors of the upper-layer thin film coil having a downward convex bottom surface, that is, the corners on the side and bottom surfaces of the thin film conductors being rounded. More preferably, the thin film conductors of the lower-layer thin film coil should have an upward convex top surface, that is, rounded corners on the side and top surfaces of the thin film conductors. The corner here is defined as the intersection of a line extended from the side surface and an imaginary horizontal line drawn from the top or bottom surface of the thin film conductors that is assumed to be horizontal. The roundness of these corners should preferably be at least 2 $\mu$mR, and the distance between the upper-layer and lower-layer thin film coils should preferably be not less than 1.0 $\mu$m. In this way, by rounding the facing corners of the thin film conductors of the upper-layer and lower-layer thin film coils, the nearest distance between the thin film conductors of the upper-layer and lower-layer thin film coils can be increased, and therefore their dielectric strength can be improved.

Figure 8:
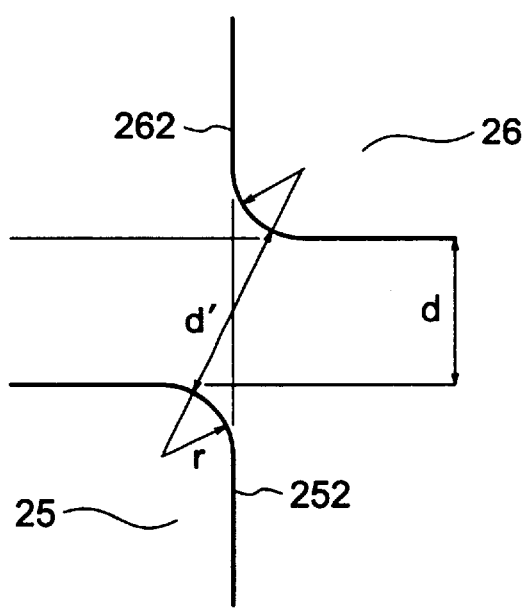
FIG. 8 is a longitudinal sectional view explaining another model where facing corners of the thin film conductors of the upper and lower layers are rounded.

Now, this will be studied in more detail, referring to the examples shown in FIGS. 7 and 8. FIGS. 7 and 8 are diagrams explaining the distance d' between the upper-layer and lower-layer thin film conductors having rounded facing corners, in which the side surface 252 of the thin film conductor of the lower-layer thin film coil 25 is assumed to be flush with the side surface 262 of the thin film conductor of the upper-layer thin film coil 26. In either of the figures, the upper corners of the thin film conductors of the lower-layer thin film coil 25 are rounded, with a corner radius of r. In FIG. 7, the entire bottom surface of the thin film conductor of the upper-layer thin film coil 26 is rounded, with a corner radius of R and the center of the radius falling on the center line of the thin film conductor. In FIG. 8, only the lower corner of the thin film conductor of the upper-layer thin film coil 26 is rounded, with a corner radius of r, the same radius as the roundness of the upper corner of the lower-layer thin film conductor.

Assuming that the distance d between the thin film conductor of the lower-layer thin film coil 25 and the thin film conductor of the upper-layer thin film coil 26 is 1.0 $\mu$m, the closest distance d' between coil surfaces was obtained. Table 1 shows changes in the distance d' with changes in corner radii r and R in the case where the entire lower surface of the upper-layer thin film conductor is rounded, and Table 2 shows the corresponding values in the case where only the lower corner of the upper-layer thin film conductor is rounded.

TABLE 1

| R ($\mu$m) | r ($\mu$m) | | |
| --- | --- | --- | --- |
| | 0.2 | 0.5 | 1.0 |
| 3 | 1.168 $\mu$m | 1.243 | 1.385 |
| 5 | 1.115 | 1.171 | 1.280 |
| 7 | 1.087 | 1.131 | 1.220 |

TABLE 2

| r ($\mu$m) | 0.2 | 0.5 | 1.0 |
| --- | --- | --- | --- |
| | 1.056 $\mu$m | 1.236 | 1.606 |

As is apparent from these tables, the distance between conductors d' can be increased by not less than 5% by rounding the corners of the thin film conductors of the upper-layer and lower-layer thin film coils to not less than 0.2 $\mu$mR. Furthermore, the distance between conductors can be increased by not less than about 10% by rounding the entire bottom surface of the upper-layer thin film conductors. Furthermore, the distance between layers on the upper-layer and lower-layer thin film coils can be further reduced because the rounded adjoining corners of the thin film conductors can prevent the concentration of electric potential.

Figure 9:
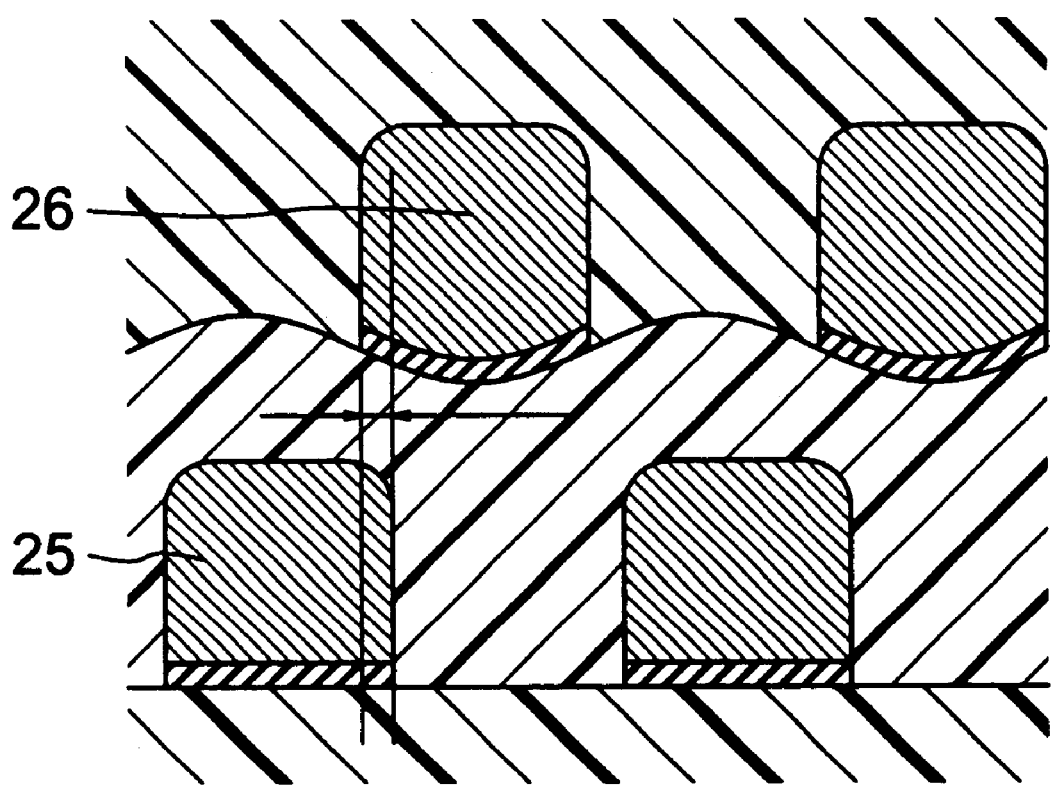
FIG. 9 is a longitudinal sectional view explaining the overlapped state of the upper and lower thin film coils in between the thin film conductors.
Figure 10:
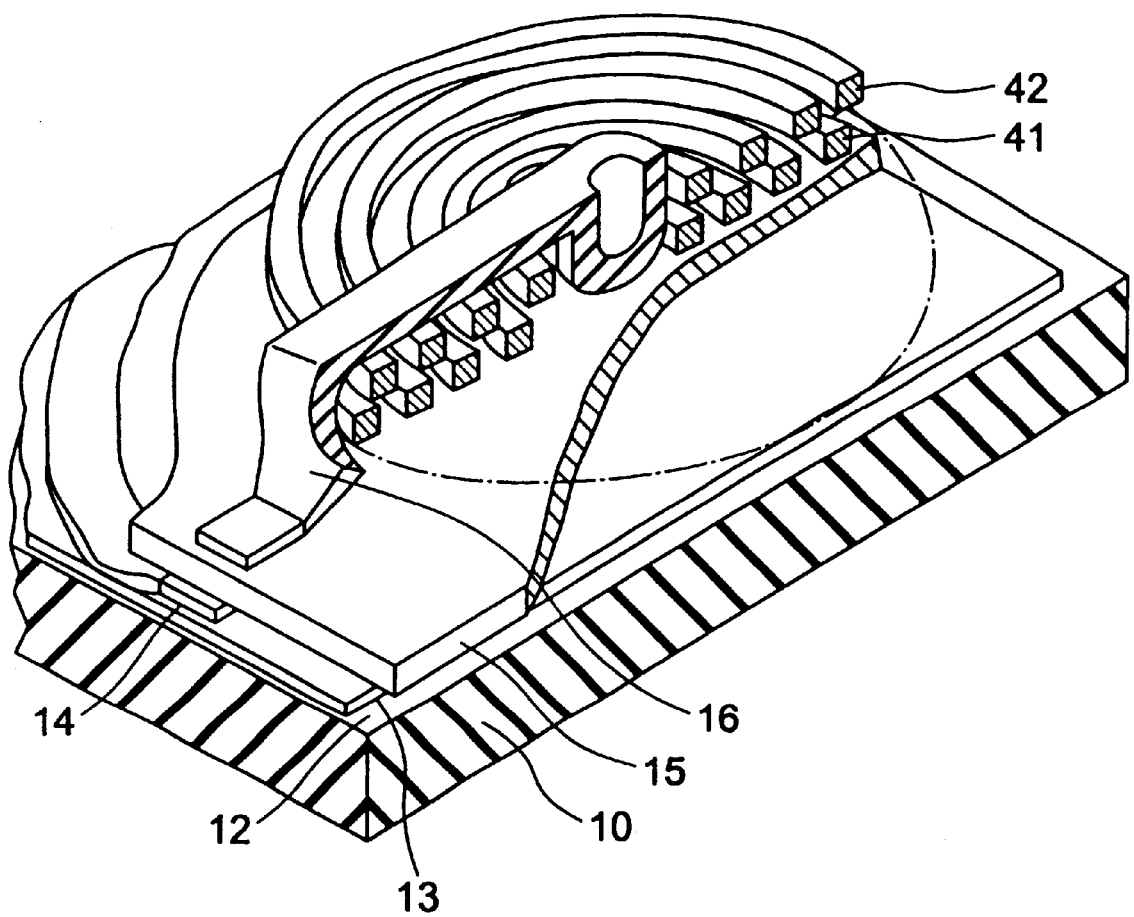
FIG. 10 is a perspective view of a thin film magnetic head of a conventional type.
Figure 11:
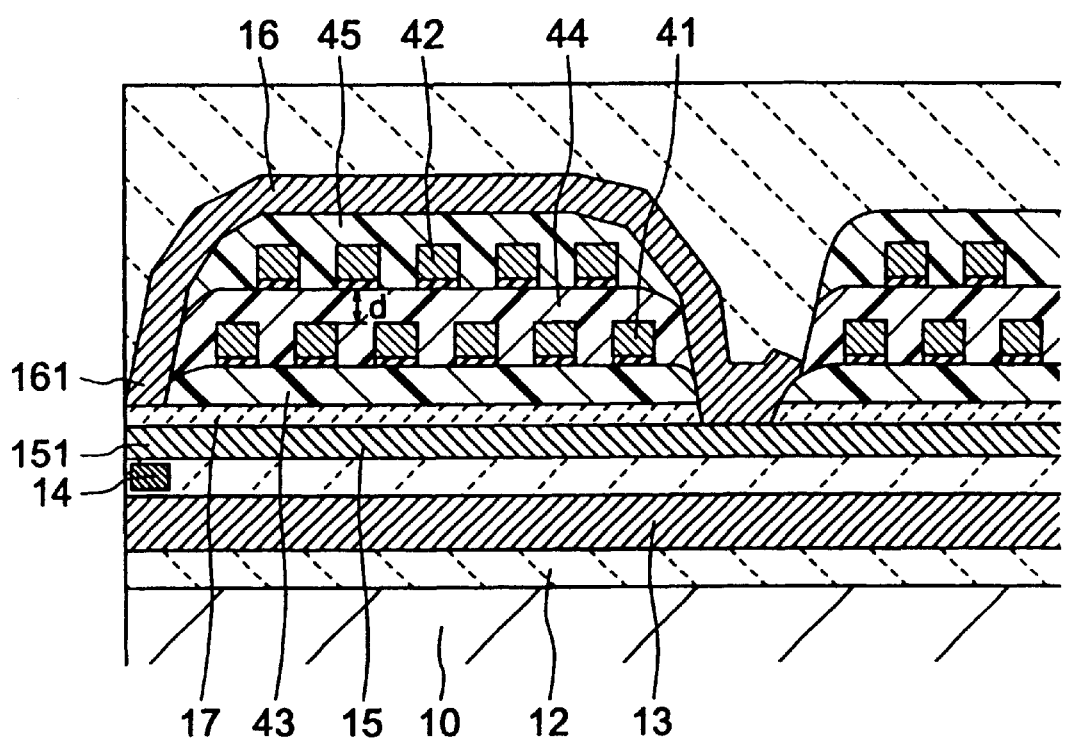
FIG. 11 is a longitudinal sectional view of a thin film magnetic head of a conventional type.

When viewed from the side the longitudinal section in the gap direction of the head, the thin film conductors of the lower-layer thin film coil 25 and the thin film conductors of the upper-layer thin film coil 26 should be such that the thin film conductors of the upper-layer thin film coil 26 are formed in between the thin film conductors of the lower-layer thin film coil 25. As shown in FIG. 9, however, the thin film conductors of the lower-layer thin film coil 25 may be partly overlapped with the thin film conductors of the upper-layer thin film coil 26. The degree of overlap should preferably be not more than ¼ of the width of the thin film conductors, that is, not more than 0.5 $\mu$m when the width of the thin film conductors is about 2 $\mu$m. More preferably, the degree of overlap should be within the rounded part of the corner of the thin film conductor.

With the above-described embodiments of this invention where the portions of the insulating resin layers 21 to 23 can be made thinner, the distance between the lower and upper magnetic cores 15 and 16 can be made smaller, and accordingly the magnetic path, and therefore inductance, of the induction type magnetic head can be reduced.

Figure 6:
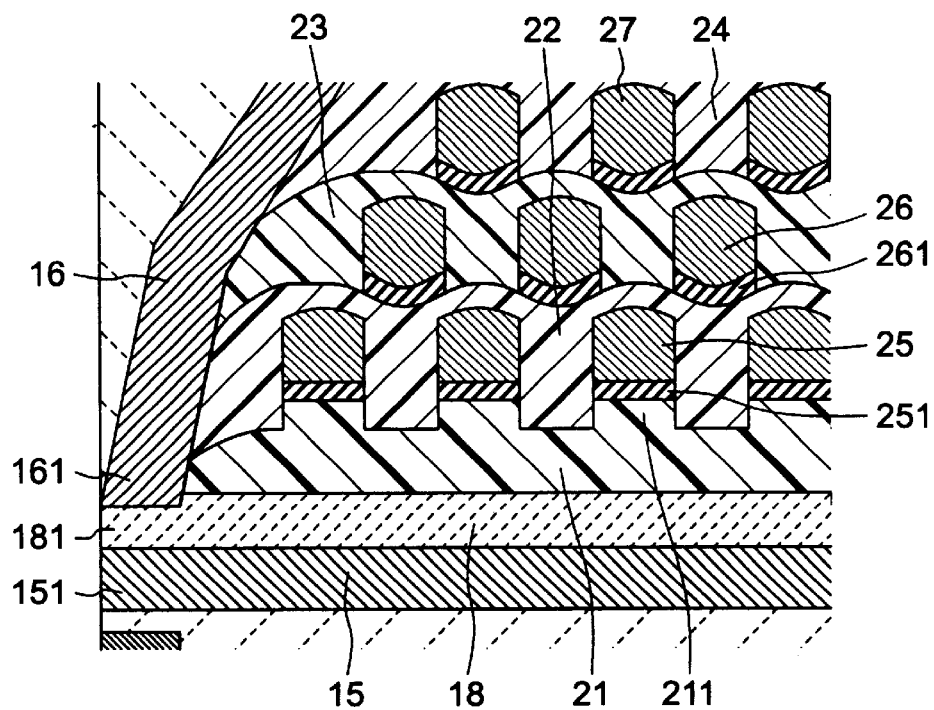
FIG. 6 is a longitudinal sectional view of still another embodiment of the thin film magnetic head according to this invention.

In addition to the embodiments shown in FIGS. 1 to 5 where the thin film coil is provided in two layers, the thin film coil can be made of a three-layer structure, as in the embodiment shown in FIG. 6. In the embodiment shown in FIG. 6, the bottom surface of the thin film conductors of the second-layer thin film coil 26 is made convex downward, replicating the undulations formed on the top surface of the second insulating resin layer 22 that wraps the lowermost-layer thin film coil 25, while the top surface of the thin film conductors of the thin film coil 26 is made convex upward so that the top surface of the third insulating resin layer 23' wrapping the thin film coil 26 can be made undulated. Then, the uppermost-layer thin film coil 27 is provided on the third insulating resin layer 23', and the bottom surface of the thin film conductors of the coil 27 is made convex downward. The fourth insulating resin layer 24 is formed in such a manner as to wrap the uppermost-layer thin film coil 27, and the upper magnetic core 16 is formed on top of it. The top surface of the thin film conductors of the uppermost-layer thin film coil 27 may be flat or convex. In this way, the thin film coil may be formed into a three-layer structure.

As described above, for the preferred embodiments of this invention where the upper thin film coil whose thin film conductors have a downward convex bottom surface is provided face-to-face in between the underlying thin film coil, the distance between coil layers can be reduced while maintaining the dielectric strength between coil layers. Thus, the coils and insulating resin layers can be made smaller, and the magnetic path through the lower and upper magnetic cores can be reduced.

What is claimed is:

1. A thin film magnetic head comprising:
    lower and upper magnetic cores provided face-to-face via a non-magnetic thin film serving as a magnetic gap;
    at least two layers of multi-layer thin film coils insulated from each other via an insulating resin layer between said magnetic cores and comprising thin film conductors wound on said magnetic cores and having a substantially rectangular cross section;
    the thin film conductors of a thin film coil of at least one layer, other than the lowermost layer, of said multi-layer thin film coils having a downward convex bottom surface;
    the thin film conductors of a thin film coil of a layer immediately below said thin film coil whose thin film conductors have the downward convex bottom surface having an upward convex top surface; and
    the thin film conductors of said upper-layer thin film coil being disposed face-to-face in between the adjoining thin film conductors of said lower-layer thin film coil in the longitudinal section in the gap depth direction of said head.

2. A thin film magnetic head as set forth in claim 1, wherein the thin film conductors of said upper-layer thin film coil are overlapped with the thin film conductors of said lower-layer thin film coil in the longitudinal section in the gap depth direction of said head by not more than ¼ of the width of said thin film conductors.

3. A thin film magnetic head comprising:
   lower and upper magnetic cores provided face-to-face via a non-magnetic thin film serving as a magnetic gap;
   at least two layers of multi-layer thin film coils insulated from each other via an insulating resin layer between said magnetic cores and comprising thin film conductors wound on said magnetic cores and having a substantially rectangular cross section;
   an insulating resin layer formed on said non-magnetic thin film having protruded portions thereon, with the thin film conductors of a thin film coil of the lowermost layer among said multi-layer thin film coils provided on said protruded portions; and
   the thin film conductors of a thin film coil of the second lowermost layer having a downward convex bottom surface and being disposed face-to-face in between the adjoining thin film conductors of said lowermost-layer thin film coil in the longitudinal section in the gap depth direction of said head.

4. A thin film magnetic head as set forth in claim 3, wherein the thin film conductors of said lowermost-layer thin film coil have an upward convex top surface.

5. A thin film magnetic head as set forth in claim 4, wherein the thin film conductors of said upper-layer thin film coil are overlapped with the thin film conductors of said lower-layer thin film coil in the longitudinal section in the gap depth direction of said head by not more than ¼ of the width of said thin film conductors.

6. A thin film magnetic head as set forth in claim 4, wherein a protruded height h of said protruded portions on said insulating resin layer formed on said non-magnetic thin film is 0.04 to 2 $\mu$m.

7. A thin film magnetic head as set forth in claim 6, wherein the protruded height h of said protruded portions on said insulating resin layer formed on said non-magnetic thin film is 0.2 to 0.5 $\mu$m.

8. A thin film magnetic head as set forth in claim 4, wherein the thickness of a magnetic gap portion of said non-magnetic thin film is thinner than the thickness of a portion extended from said magnetic gap portion; and a ratio (h'/h) of the difference in thickness h' to the protruded height h of said protruded portion is 0.1 to 0.5.

9. A thin film magnetic head as set forth in claim 4, wherein the thickness of a magnetic gap portion of said non-magnetic thin film is thinner than the thickness of a portion extended from said magnetic gap portion; and the difference in thickness h' is ⅕ to ¹⁄₁₅ of the length of said magnetic gap.

10. A thin film magnetic head comprising:
    lower and upper magnetic cores provided face-to-face via a non-magnetic thin film serving as a magnetic gap;
    at least two layers of multi-layer thin film coils insulated from each other via an insulating resin layer between said magnetic cores and comprising thin film conductors wound on said magnetic cores and having a substantially rectangular cross section;
    the thin film conductors of a thin film coil of at least one layer, other than the lowermost layer, of said multi-layer thin film coils having rounded corners on the side and bottom surfaces thereof;
    the thin film conductors of a thin film coil of a layer immediately below said thin film coil that have said thin film conductors with rounded bottom-surface corners having rounded corners on the side and top surfaces thereof; and
    the thin film conductors of said upper-layer thin film coil being disposed face-to-face in between the adjoining thin film conductors of said lower-layer thin film coil in the longitudinal section in the gap depth direction of said head.

11. A thin film magnetic head as set forth in claim 10, wherein an insulating resin layer formed on said non-magnetic thin film has protruded portions thereon, with the thin film conductors of the lowermost-layer thin film coil among said multi-layer thin film coils provided on said protruded portions, and
    said thin film conductors having rounded top-surface corners are of the lowermost-layer thin film coil.

12. A thin film magnetic head as set forth in claim 11, wherein the roundness of said corners of said thin film conductors is not less than 0.2 $\mu$m.

13. A thin film conductors as set forth in claim 12, wherein the thin film conductors of said upper-layer thin film coil are overlapped with the thin film conductors of said lower-layer thin film coil in the longitudinal section in the gap depth direction of said head by not more than ¼ of the width of said thin film conductors.

14. A thin film magnetic head as set forth in claim 12, wherein the thin film conductors of said upper-layer thin film coil are overlapped with the thin film conductors of said lower-layer thin film coil in the longitudinal section in the gap depth direction of said head within the rounded portion of said thin film conductors.

15. A thin film magnetic head as set forth in claim 12, wherein a protruded height h of said protruded portions on said insulating resin layer formed on said non-magnetic thin film is 0.04 to 2 $\mu$m.

16. A thin film magnetic head as set forth in claim 15, wherein the protruded height h of said protruded portions on said insulating resin layer formed on said non-magnetic thin film is 0.2 to 0.5 $\mu$m.

17. A thin film magnetic head as set forth in claim 12, wherein the thickness of a magnetic gap portion of said non-magnetic thin film is thinner than the thickness of a portion extended from said magnetic gap portion; and a ratio (h'/h) of the difference in thickness h' to the protruded height h of said protruded portion is 0.1 to 0.5.

18. A thin film magnetic head as set forth in claim 12, wherein the thickness of a magnetic gap portion of said non-magnetic thin film is thinner than the thickness of a portion extended from said magnetic gap portion; and the difference in thickness h' is ⅕ to ¹⁄₁₅ of the length of said magnetic gap.

19. A manufacturing method of a thin film magnetic head comprising:
    forming a nonmagnetic thin film serving as a magnetic gap on a lower magnetic core;
    forming an insulating resin layer on said non-magnetic thin film, with a magnetic gap portion thereof left; and
    repeating by a necessary number of times the formation of a thin film coil comprising thin film conductors having a substantially rectangular cross section and an insulating resin layer covering said thin film coil on said insulating resin layer;
    said thin film coil of the lowermost layer being formed by depositing by sputtering an electrically conductive film on said insulating resin layer below said lowermost-layer thin film coil, depositing by electroplating the thin film conductors of said lowermost-layer thin film coil on said electrically conductive film, and providing protruded portions on said insulating resin layer below said thin film conductors by removing by ion milling said electrically conductive film underlying in between said thin film conductors and removing by ion milling the top part of said insulating resin layer underlying in between said thin film conductors.

20. A manufacturing method of a thin film magnetic head as set forth in claim 19, wherein when removing said electrically conductive film and the top part of said insulating resin layer lying in between said thin film conductors, the length of said magnetic gap is determined by simultaneously ion milling the magnetic gap portion of said non-magnetic thin film.

21. A manufacturing method of a thin film magnetic head as set forth in claim 19, wherein an insulating resin film having irregularities on the surface thereof is provided by covering said lowermost-layer thin film coil and said insulating resin layer the top part of which in between said thin film conductors has been removed by ion milling with an insulating resin layer, and the thin film conductors of a second-layer thin film coil is formed in the recess of said irregularities.

* * * * *